UNITED STATES PATENT OFFICE.

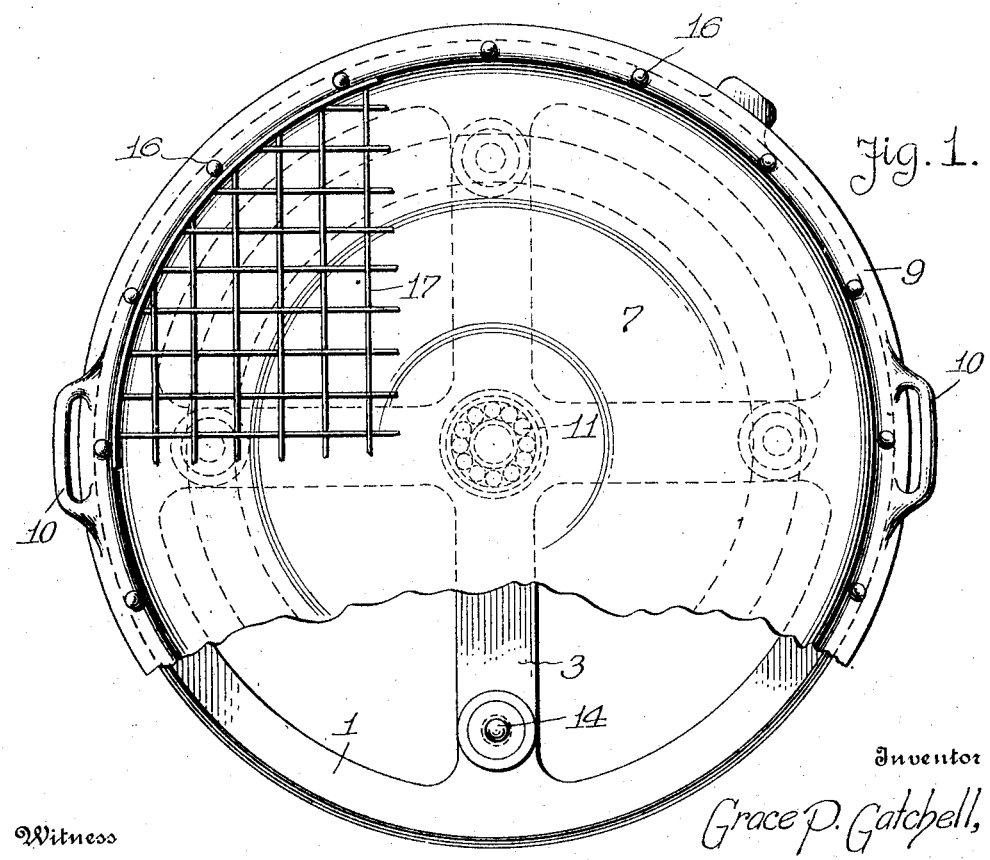

GRACE P. GATCHELL, OF DETROIT, MICHIGAN.

GRIDDLE-PAN.

1,332,251.  Specification of Letters Patent.  Patented Mar. 2, 1920.

Application filed January 30, 1919. Serial No. 273,967.

*To all whom it may concern:*

Be it known that I, GRACE P. GATCHELL, a citizen of the United States of America, residing at Detroit, in the county of Wayne and State of Michigan, have invented certain new and useful Improvements in Griddle-Pans, of which the following is a specification, reference being had therein to the accompanying drawings.

The primary object of my invention is to provide a rotary griddle on which various kinds of cakes can be uniformly cooked by having the griddle cakes evenly done and properly browned. This is accomplished by rotating the griddle so that cakes thereon may be subjected to heat from a hot portion of a stove, gas range or other cooking apparatus.

Another object of my invention is to provide a strong, durable rotary griddle with novel means to facilitate shifting the griddle on its pivot, and provision is made for evenly and anti-frictionally supporting the rotary portion of the griddle.

A further object of my invention is to provide a simple and inexpensive griddle of the above type that may be furnished with a screen of foraminous superposed member for supporting bread or other edibles that may be toasted, warmed or otherwise prepared on the griddle.

The above and other objects are attained by a mechanical construction that will be hereinafter described and then claimed, and reference will now be had to the drawing, wherein—

Figure 1 is a plan of the griddle, partly broken away;

Fig. 2 is a cross sectional view of the griddle, and

Fig. 3 is a side elevation of the same.

In the drawing, the reference numeral 1 denotes a spider or base member having a depending annular flange 2 that is slightly inclined and adapted to support the spider in a superposed position relative to the grid or top of a stove. The spider has converging arms 3 supporting a central depressed bearing portion 4 which is provided with a vertical opening 5 to receive a central depending pivot pin 6 of a griddle member 7.

The griddle member 7 is circular in plan and is formed with an annular rim 8 and an annular flange 9, said flange being disposed at an angle so that it may constitute an apron surrounding the flange 2 and in spaced relation thereto. This flange facilitates positioning the griddle member 7 on the spider 1 and said flange is adapted to prevent batter and other matter from splashing into or entering the space between the spider 1 and the griddle member. The flange 9 also lends a finish to the cooking utensil and at diametrically opposed points there are suitable handles 10 on the flange 9 so that the griddle member may be easily handled when the cooking utensil is being cleaned or assembled for use.

To insure an easy rotation of the griddle member 7 on the spider 1, I may use anti-frictional bearings. For instance, the bearing portion 4 of the spider 1 may be provided with a ball bearing 11 in suitable race members or a cage 12 interposed between the griddle member 7 and the spider 1. In addition to this central anti-frictional bearing the arms 3, contiguous to the outer ends thereof, may be provided with cages or sockets 13 for ball bearings 14, and the lower face of the griddle member 7 may be provided with an annular bearing portion or face 15 to rest on the ball bearings 14. I would have it understood that the ball bearings may be dispensed with and provision made at the central bearing portion 4 for maintaining the griddle member 7 in spaced relation to the spider 1.

To facilitate rotating the griddle member 7, the rim 8 thereof is provided with a plurality of spaced lugs or protuberances 16, and when the griddle is in use, a cake turner, knife or any other convenient article may be placed in engagement with one of the lugs 15 to impart a rotary movement to the griddle member.

Besides the rim 8 preventing batter or other matter from flowing off of the edges of the griddle member, said rim constitutes an annular seat for a circular screen or foraminous member 17, which can be easily placed on the rim 8 and bodily centered thereon by the marginal edges of the screen engaging the lugs 16. This screen will support bread and other matter in a superposed position relative to the griddle member 7 and therefore permit of bread or other matter being toasted, warmed or otherwise heat treated.

With the rotary griddle member having a substantial bearing on the spider 1 it may be safely greased to receive batter, said griddle member being of a size to receive one or more deposits of batter and should one part of a stove cooking top be warmer than another part, it is possible to rotate the griddle member 7 so that batter thereon may be exposed to a desired portion of the stove cooking top and thus have the cakes uniformly baked.

It is thought that the utility of my cooking utensil will be apparent without further description, and while in the drawing there is illustrated a preferred embodiment of my invention, it is to be understood that the utensil is susceptible to such changes, in size, shape and manner of assemblage, as fall within the scope of the appended claims.

What I claim is:

1. A griddle comprising a spider having a depending annular flange, a central apertured bearing portion, a griddle member on said spider in spaced relation thereto and having a depending pivot pin extending into the central apertured bearing portion of said spider, a depending flange on said griddle member providing an apron about the flange of said spider, a rim on said griddle member having upwardly extending lugs, and a screen adapted to be supported by said rim in spaced relation to said griddle member and held against lateral displacement by said lugs.

2. A griddle comprising a spider having arms, a detachable rotary griddle member having a central pivot in said spider, an anti-frictional ball holding cage about the pivot of said griddle member, a depending flange on said griddle member providing an apron about the spider, anti-frictional bearings constantly held by the arms of said spiders, and an annular bearing portion on the bottom of said griddle member and supporting said griddle member on said bearings and in spaced relation to said spider.

In testimony whereof I affix my signature in the presence of two witnesses.

GRACE P. GATCHELL.

Witnesses:
ANNA M. DORR,
CHAS. W. STAUFFIGER.